(12) United States Patent
Segalovich et al.

(10) Patent No.: US 9,594,484 B2
(45) Date of Patent: Mar. 14, 2017

(54) METHOD AND SYSTEMS FOR NAVIGATING TO A SUB-RESOURCE OF AN INTERNET RESOURCE

(71) Applicants: YANDEX EUROPE AG, Lucerne (CH); YANDEX LLC, Moscow (RU); YANDEX INC., Palo Alto, CA (US)

(72) Inventors: Ilya Valentinovich Segalovich, Moscow (RU); Konstantin Pavlovitch Gorskiy, Moscow (RU); Roman Kirillovitch Ivanov, Moscow (RU)

(73) Assignee: YANDEX EUROPE AG, Luzern (CH)

( * ) Notice: Subject to any disclaimer, the term of this patent is extended or adjusted under 35 U.S.C. 154(b) by 244 days.

(21) Appl. No.: 14/433,026

(22) PCT Filed: Oct. 1, 2013

(86) PCT No.: PCT/US2013/062797
§ 371 (c)(1),
(2) Date: Apr. 1, 2015

(87) PCT Pub. No.: WO2014/055470
PCT Pub. Date: Apr. 10, 2014

(65) Prior Publication Data
US 2015/0277709 A1 Oct. 1, 2015

(30) Foreign Application Priority Data

Oct. 1, 2012 (WO) ............... PCT/RU2012/000080
Apr. 1, 2013 (RU) ................................. 2013115566

(51) Int. Cl.
*G06F 3/00* (2006.01)
*G06F 3/0484* (2013.01)
(Continued)

(52) U.S. Cl.
CPC .......... *G06F 3/04842* (2013.01); *G06F 3/048* (2013.01); *G06F 3/0481* (2013.01); *G06F 17/30873* (2013.01); *H04L 67/02* (2013.01)

(58) Field of Classification Search
CPC .................................................. G06F 3/04842
(Continued)

(56) References Cited

U.S. PATENT DOCUMENTS 6,167,441 A    12/2000  Himmel
8,977,779 B2*  3/2015   Pratt ...................... G06Q 10/10
                                                            709/200

(Continued)

FOREIGN PATENT DOCUMENTS

WO       2010018255 A1    7/2010

OTHER PUBLICATIONS

Supplementary European Search Report from EP 13844350, Munich, Konak, Eyup, May 4, 2016.
(Continued)

*Primary Examiner* — William Titcomb
(74) *Attorney, Agent, or Firm* — BCF LLP

(57) ABSTRACT

The present relates to a method and system for navigating to a sub-resource of an Internet resource. The method and system comprises receiving information regarding a particularly determined sub-resource of the Internet resource. The particularly determined sub-resource is defined independently of the publisher of the Internet resource. The method and system comprises displaying, contemporaneously with the display of the Internet resource, a user-selectable object. The user-selectable object has an associated indication of the sub-resource of the Internet resource. And the method and system comprises, upon selection of the user-selectable object, displaying the sub-resource.

18 Claims, 4 Drawing Sheets

(51) Int. Cl.
  *G06F 3/048*     (2013.01)
  *H04L 29/08*     (2006.01)
  *G06F 17/30*     (2006.01)
  *G06F 3/0481*    (2013.01)

(58) Field of Classification Search
  USPC .......................................................... 715/738
  See application file for complete search history.

(56) References Cited

U.S. PATENT DOCUMENTS

| | | | |
|---|---|---|---|
| 9,185,221 B1* | 11/2015 | Billman | H04M 3/523 |
| 2008/0288476 A1 | 11/2008 | Kim et al. | |
| 2009/0282345 A1 | 11/2009 | Smith et al. | |
| 2010/0095216 A1 | 4/2010 | Morse et al. | |
| 2010/0250782 A1* | 9/2010 | Pratt | G06Q 10/10 |
| | | | 709/248 |
| 2012/0136742 A1 | 5/2012 | Yu et al. | |
| 2012/0290959 A1* | 11/2012 | Quine | G06F 8/34 |
| | | | 715/765 |
| 2014/0143676 A1* | 5/2014 | Tan | G06F 3/0484 |
| | | | 715/744 |
| 2015/0113477 A1* | 4/2015 | Haussila | G06F 3/04847 |
| | | | 715/810 |
| 2016/0085521 A1* | 3/2016 | Savliwala | G06F 17/30867 |
| | | | 717/108 |

OTHER PUBLICATIONS

International Search Report from PCT/US2013/062797; Blaine R. Copenheaver; Apr. 16, 2014.

\* cited by examiner

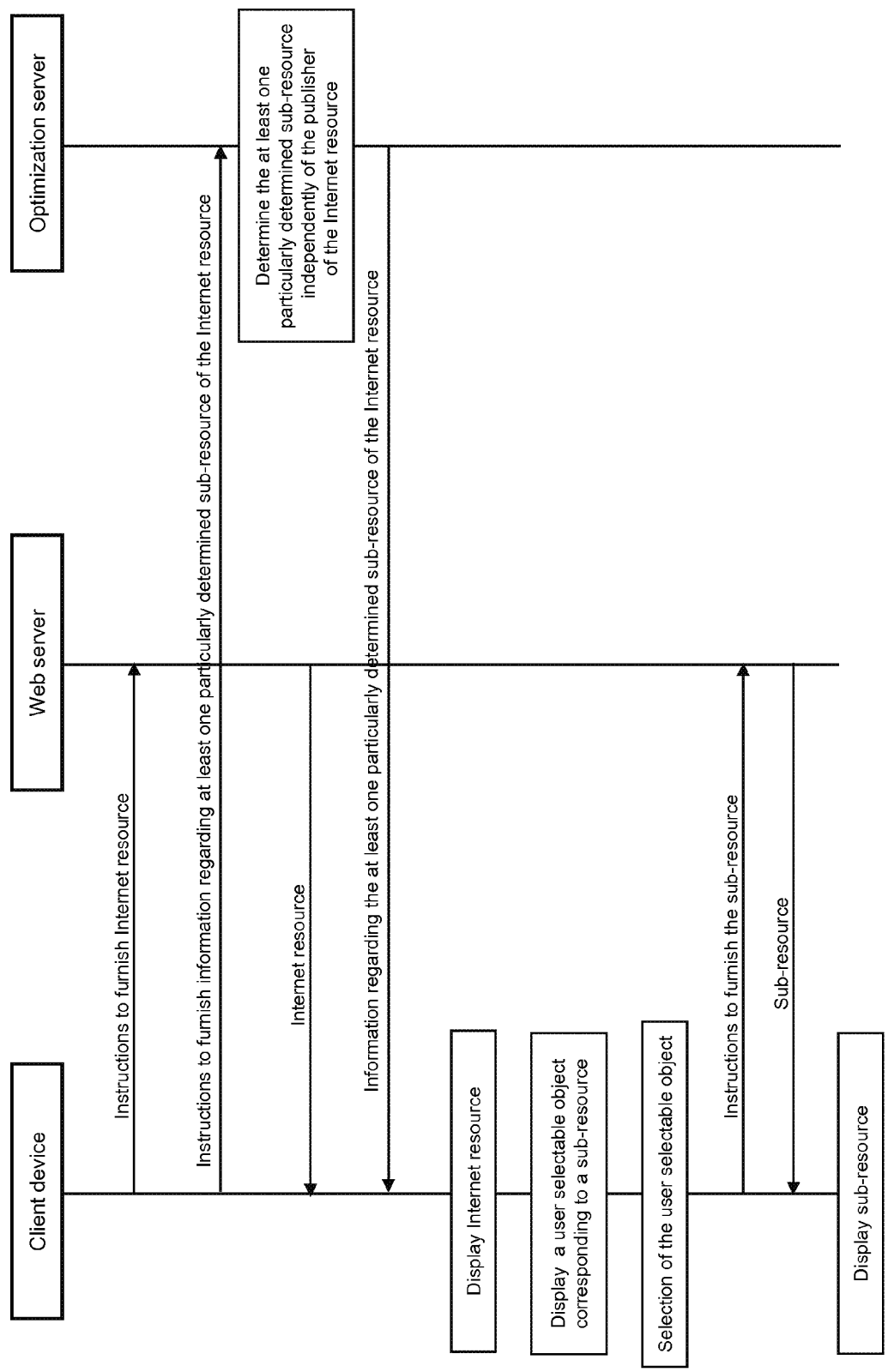

METHOD AND SYSTEMS FOR NAVIGATING TO A SUB-RESOURCE OF AN INTERNET RESOURCE

CROSS-REFERENCE TO RELATED APPLICATIONS

The present application claims convention priority to (1) International Application No. PCT/RU2012/000800, filed Oct. 1, 2012, entitled "Method and System for Navigating to a Sub-Resource of an Internet Resource" and to (2) Russian Patent Application No. 2013115566, filed Apr. 1, 2013, entitled "Method and System for Navigating to a Sub-Resource of an Internet Resource". These applications are incorporated by reference herein in their entirety. The following applications are also incorporated by reference herein in their entirety: (1) International Application No. PCT/RU2012/000801, filed Oct. 1, 2012, entitled "Methods, Systems And Programs For Retrieving Information On The Internet"; (2) International Application No. PCT/RU2012/000799, filed Oct. 1, 2012, entitled "Method and Browser for Displaying Overlaid Webpages"; (3) International Patent Application No. PCT/RU2012/000798, filed Oct. 1, 2012, entitled "Method of and System for Providing Information to a User of a Client Device"; (4) Russian Patent Application No. 2013115564, filed Apr. 1, 2013, entitled "Methods, Systems And Programs For Retrieving Information On The Internet"; (5) Russian Patent Application No. 2013115565, filed Apr. 1, 2013, entitled "Method and Browser for Displaying Overlaid Webpages"; and (6) Russian Patent Application No. 2013115567, filed Apr. 1, 2013, entitled "Method of and System for Providing Information to a User of a Client Device".

FIELD

The present specification relates to the field of user experience improvement for Internet navigation; and more particularly to providing assistance in navigation to a sub-resource of an Internet resource.

BACKGROUND

The complexity of various categories of web sites (like for example e-commerce or telecommunication service providers web sites) can be very high. This is due to the fact that the web site includes a large number of web pages, and some of these web pages may include a large quantity of information. For an end user, it may a frustrating experience to access to a specific feature of the web site, located at a specific web page. Thus, assistance in navigation to a sub-resource (e.g. a web page) of an Internet resource (e.g. a web site) may be beneficial.

The owner of a web site usually includes one or several shortcut links on all web pages of the web site (or at least on a subset of the web pages of the web site). These shortcut links provide direct access to a specific web page of the web site, where a specific functionality is located. For example, a web site may have a public part and a private part; the private part being accessible only after a user logs in with his credentials. Thus, a shortcut link to a log-in web page may be displayed on every public web page of the web site. The shortcut link may consist of a clickable text or icon, or a selectable item in a menu.

The aforementioned optimization of the browsing experience, by means of shortcut links, is specific to each particular web site. It is the owner of the web site who decides how the web site should be optimized; including which features of the web site should be easily accessible by means of shortcut links, and where these shortcut links should be displayed. Consequently, the user experience may be different for each particular web site; even for similar web sites (for instance, two e-commerce web sites may offer a completely different user experience).

From a user experience perspective, it would be beneficial to provide an optimization of the access to particular web pages of a web site that is not dependent of a specific implementation of the web site.

An existing optimization of the access to web pages of a web site consists in segmenting the Uniform Resource Locator (URL) displayed in the URL bar of a web browser. Selecting a specific segment triggers the display in the web browser of a corresponding web page. For instance, we consider the following URL www.google.com/some/thing displayed in the URL bar. The page currently displayed in the browser corresponds to this URL. Selecting the segment google triggers the display of the web page corresponding to the URL www.google.com. And selecting the segment some triggers the display of the web page corresponding to the URL www.google.com/some. The limitation with this approach is that the optimized access to web pages of the web site is determined by the URL of the web page currently displayed in the URL bar. Referring to the previous example, an optimized access to a web page corresponding to the URL http://www.google.another is not possible with this type of optimization.

Further improvements to conventional navigation to a sub-resource of an Internet resource are therefore desirable.

SUMMARY

It is an object of the technology disclosed in the present specification to ameliorate at least some of the inconveniences present in the prior art.

According to a first broad aspect of the present technology, there is provided a method of navigating to at least one sub-resource of an Internet resource, where the method comprises sending, from a client device to at least one server, instructions to furnish the client device with the Internet resource. The method comprises, sending, from the client device to the at least one server, instructions to furnish the client device with information regarding at least one particularly determined sub-resource of the Internet resource. The at least one particularly determined sub-resource is defined independently of the publisher of the Internet resource. The method comprises receiving, from the at least one server on the client device, the Internet resource. The method comprises receiving, from the at least one server on the client device, the information regarding the at least one particularly determined sub-resource of the Internet resource. The method comprises displaying, on the client device, the Internet resource. The method comprises displaying, on the client device contemporaneously with the display of the Internet resource, at least one user-selectable object. The user-selectable object has an associated indication of the at least one sub-resource of the Internet resource. The associated indication is based, at least in part, on the information. The method comprises, upon a user of the client device selecting one of the at least one user-selectable object, sending, from the client device to the at least one server, instructions to furnish the client device with the sub-resource. The method comprises receiving, from the at least one server on the client device, the sub-resource. And the method comprises displaying, on the client device, the sub-resource.

According to a second broad aspect of the present technology, there is provided a method of navigating to at least one sub-resource of an Internet resource, where the method comprises receiving, from a client device by at least one server, information regarding an Internet resource to be displayed on the client device. And the method comprises sending, by the at least one server to the client device, information regarding at least one particularly determined sub-resource of the Internet resource. The at least one particularly determined sub-resource is defined independently of the publisher of the Internet resource. The information includes instructions to display, contemporaneously with the display of the Internet resource, at least one user-selectable object, the user-selectable object having an associated indication of the at least one particularly determined sub-resource. And the information includes instructions to determine the associated indication of the at least one particularly determined sub-resource of the Internet resource.

According to another broad aspect of the present technology, there is provided a system for navigating to at least one sub-resource of an Internet resource, where the system comprises a client device. The client device includes a computer processor, a display operationally connected with the computer processor, a user interface operationally connected with the computer processor, a communication interface operationally connected with the computer processor and structured and configured to communicate with at least one server, and a non-transient computer information storage device operationally connected with the computer processor. The information storage device contains instructions that when executed by the computer processor effect a sending, from the client device to the at least one server, of instructions to furnish the client device with the Internet resource. The instructions effect a sending, from the client device to the at least one server, of instructions to furnish the client device with information regarding at least one particularly determined sub-resource of the Internet resource. The at least one particularly determined sub-resource is defined independently of the publisher of the Internet resource. The instructions effect a receiving, from the at least one server on the client device, of the Internet resource. The instructions effect a receiving, from the at least one server on the client device, of the information regarding the at least one particularly determined sub-resource of the Internet resource. The instructions effect a display, on the client device, of the Internet resource. The instructions effect a display, on the client device contemporaneously with the display of the Internet resource, of at least one user-selectable object. The user-selectable object has an associated indication of the at least one sub-resource of the Internet resource. The associated indication is based, at least in part, on the information. The instructions effect, upon a user of the client device selecting via the user interface one of the at least one user-selectable object, a sending, from the client device to the at least one server, of instructions to furnish the client device with the sub-resource. The instructions effect a receiving, from the at least one server on the client device, of the sub-resource. And the instructions effect a display, on the client device, of the sub-resource.

According to yet another broad aspect of the present technology, there is provided a system for navigating to at least one sub-resource of an Internet resource, where the system comprises at least one server. The at least one server includes a computer processor, a communication interface operationally connected with the computer processor and structured and configured to communicate with a client device, and a non-transient computer information storage device operationally connected with the computer processor. The information storage device contains instructions, that when executed by the computer processor effect a receiving, from the client device by the at least one server, of information regarding an Internet resource to be displayed on the client device. And the instructions effect a sending, by the at least one server to the client device, of information regarding at least one particularly determined sub-resource of the Internet resource. The at least one particularly determined sub-resource is defined independently of the publisher of the Internet resource. The information includes instructions to display, contemporaneously with the display of the Internet resource, at least one user-selectable object. The user-selectable object has an associated indication of the at least one particularly determined sub-resource. And the information includes instructions to determine the associated indication of the at least one particularly determined sub-resource of the Internet resource.

According to a further broad aspect of the present technology, there is provided a non-transient computer information storage medium containing instructions for navigating to at least one sub-resource of an Internet resource; where the non-transient computer information storage medium contains instructions, that when executed by a computer processor effect a sending, from a client device to at least one server, of instructions to furnish the client device with an Internet resource. The instructions effect a sending, from the client device to the at least one server, of instructions to furnish the client device with information regarding at least one particularly determined sub-resource of the Internet resource. The at least one particularly determined sub-resource is defined independently of the publisher of the Internet resource. The instructions effect a receiving, from the at least one server on the client device, of the Internet resource. The instructions effect a receiving, from the at least one server on the client device, of the information regarding the at least one particularly determined sub-resource of the Internet resource. The instructions effect a display, on the client device, of the Internet resource. The instructions effect a display, on the client device contemporaneously with the display of the Internet resource, of at least one user-selectable object. The user-selectable object has an associated indication of the at least one sub-resource of the Internet resource. The associated indication is based, at least in part, on the information. The instructions effect, upon a user of the client device selecting one of the at least one user-selectable object, a sending, from the client device to the at least one server, of instructions to furnish the client device with the sub-resource. The instructions effect a receiving, from the at least one server on the client device, of the sub-resource. And the instructions effect a display, on the client device, of the sub-resource.

According to a yet further broad aspect of the present technology, there is provided a non-transient computer information storage medium containing instructions for navigating to at least one sub-resource of an Internet resource; where the non-transient computer information storage medium contains instructions, that when executed by a computer processor effect a receiving, from a client device by at least one server, of instructions regarding an Internet resource to be displayed on the client device. And the instructions effect a sending, by the at least one server to the client device, of information regarding at least one particularly determined sub-resource of the Internet resource. The at least one particularly determined sub-resource is defined independently of the publisher of the Internet resource. The information includes instructions to display, contemporaneously with the display of the Internet resource, at least one user-selectable object. The user-selectable object has an associated indication of the at least one particularly determined sub-resource. And the information includes instructions to determine the associated indication of the at least one particularly determined sub-resource of the Internet resource.

According to a further broad aspect of the present technology, there is provided a client device comprising a browser, for implementing the steps of: sending data from the client device to at least one server, receiving data from the at least one server on the client device, and displaying information on the client device.

According to a further broad aspect of the present technology, there is provided a web server for: sending, from a client device to the web server, instructions to furnish the client device with an Internet resource; receiving, from the web server on the client device, the Internet resource; sending, from the client device to the web server, instructions to furnish the client device with a sub-resource of the Internet resource; and receiving, from the web server on the client device, the sub-resource.

According to a further broad aspect of the present technology, there is provided an optimization server for: sending, from a client device to the optimizing server, instructions to furnish the client device with information regarding at least one particularly determined sub-resource of an Internet resource; and receiving, from the optimizing server on the client device, the information regarding the at least one particularly determined sub-resource of the Internet resource.

In some aspects of the present technology, at least one particularly determined sub-resource of an Internet resource is defined by a provider of a search engine.

In some aspects of the present technology, at least one particularly determined sub-resource of an Internet resource is defined by a provider of a web browser.

In some aspects of the present technology, at least one particularly determined sub-resource of an Internet resource is defined, based on information related to a group of Internet resources of which the Internet resource is a member.

In some aspects of the present technology, at least one particularly determined sub-resource of an Internet resource is defined, based on information relating to the Internet resource.

In some aspects of the present technology, at least one particularly determined sub-resource of an Internet resource is defined, based on information relating to more than one of the sub-resources of the Internet resource.

In some aspects of the present technology, at least one particularly determined sub-resource of an Internet resource is defined, based on at least one specific criterion.

In some aspects of the present technology, the specific criterion is at least one selected from the group comprising: a popularity of the sub-resource and a usability of the sub-resource.

In some aspects of the present technology, the at least one specific criterion is a common feature of Internet resources of the group of Internet resources of which the Internet resource is a member.

In some aspects of the present technology, the at least one particularly determined sub-resource is a plurality of particularly determined sub-resources.

In some aspects of the present technology, the Internet resource is a home page of a website, and the sub-resource is a web page other than the home page of the web site.

One advantage of the technology disclosed in the present specification over the prior art is that it improves the user experience when navigating Internet resources. And this improvement is provided via an optimization of the access to particular Internet resources, which is not dependent of a specific implementation of the Internet resources. For example, in the context of a web site, the navigation is improved by providing an optimization of the access to particular web pages of the web site, which is not dependent of a specific implementation of the web site. This includes a uniform rendering of shortcut links for multiple web sites, instead of a specific rendering for each web site (as per the prior art). This also includes a determination of the specific web pages for which an optimized access is provided, which is performed on various types of criteria. And these criteria may be applied to a whole category of web sites, instead of applying different criteria for each particular web site (as per the prior art).

Another advantage of the technology disclosed in the present specification over the prior art, is that the determination of the optimizations to be applied to the navigation to Internet resources may be implemented at a centralized optimization server. Thus, there is no need to modify each specific server hosting specific Internet resources (for example, each specific web server). This allows the providers of particular Internet applications or Internet services, like for example the provider of a web browser or the provider of a search engine, to offer the aforementioned optimization of the navigation to Internet resources. For instance, the provider of a web browser may offer the aforementioned optimization by adapting the software of its web browser, and operating an optimization server.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 1 illustrates a method of navigating to at least one sub-resource of an Internet resource, according to a non-limiting embodiment of the present technology.

DETAILED DESCRIPTION

Figure 2A:
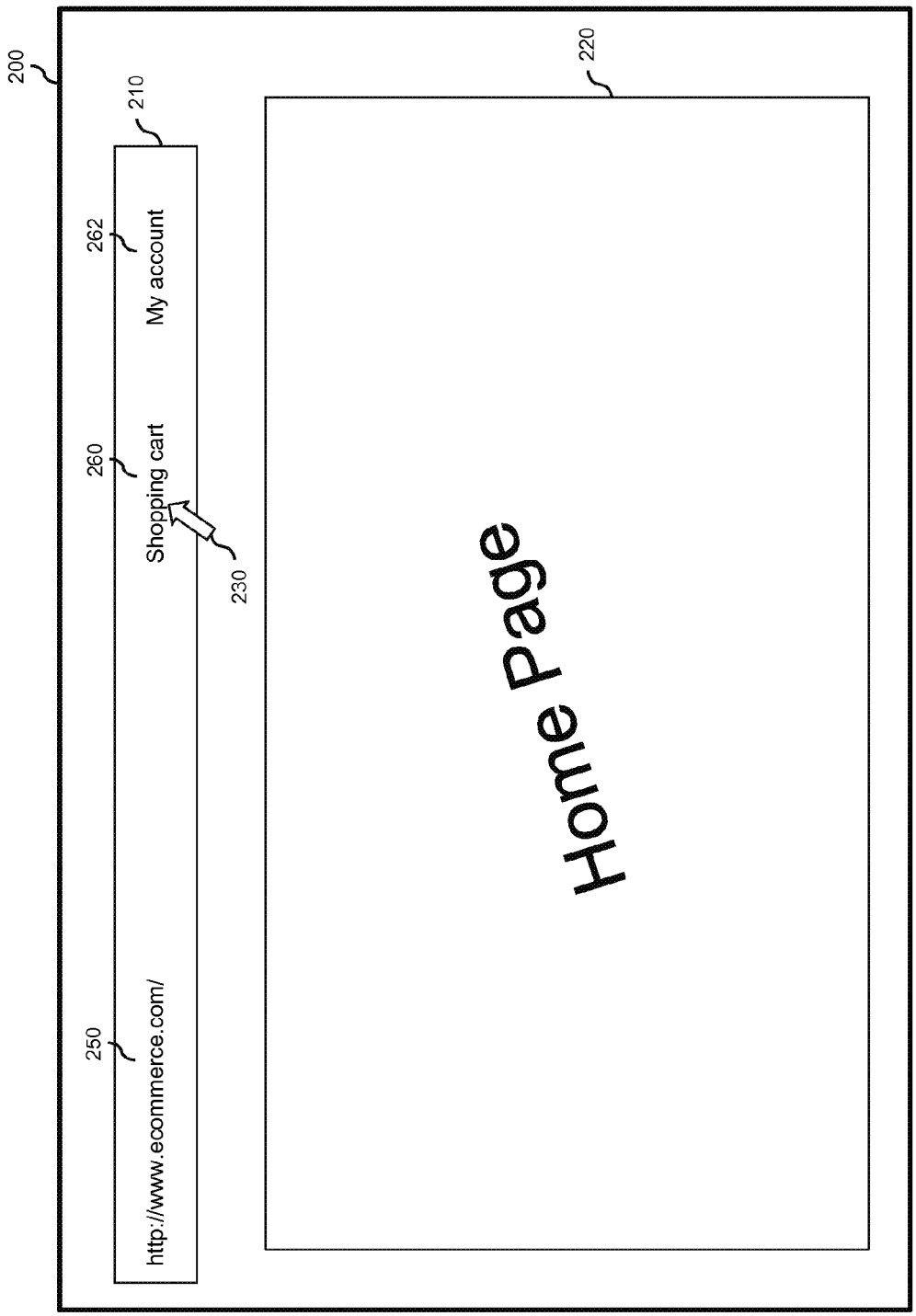
FIGS. 2A and 2B illustrate a process of navigation to at least one sub-resource of an Internet resource, according to a non-limiting embodiment of the present technology.

The present technology relates to a method of navigating to at least one sub-resource of an Internet resource.

In one aspect, the method comprises sending, from a client device to at least one server, instructions to furnish the client device with the Internet resource. The method comprises, sending, from the client device to the at least one server, instructions to furnish the client device with information regarding at least one particularly determined sub-resource of the Internet resource. The at least one particularly determined sub-resource is defined independently of the publisher of the Internet resource. The method comprises receiving, from the at least one server on the client device, the Internet resource. The method comprises receiving, from the at least one server on the client device, the information regarding the at least one particularly determined sub-resource of the Internet resource. The method comprises displaying, on the client device, the Internet resource. The method comprises displaying, on the client device contemporaneously with the display of the Internet resource, at least one user-selectable object. The user-selectable object has an associated indication of the at least one sub-resource of the Internet resource. The associated indication is based, at least in part, on the information. The method comprises, upon a user of the client device selecting one of the at least one user-selectable object, sending, from the client device to the at least one server, instructions to furnish the client device with the sub-resource. The method comprises receiving, from the at least one server on the client device, the sub-resource. And the method comprises displaying, on the client device, the sub-resource.

In another aspect, the method comprises receiving, from a client device by at least one server, information regarding an Internet resource to be displayed on the client device. And the method comprises sending, by the at least one server to the client device, information regarding at least one particularly determined sub-resource of the Internet resource. The at least one particularly determined sub-resource is defined independently of the publisher of the Internet resource. The information includes instructions to display, contemporaneously with the display of the Internet resource, at least one user-selectable object, the user-selectable object having an associated indication of the at least one particularly determined sub-resource. And the information includes instructions to determine the associated indication of the at least one particularly determined sub-resource of the Internet resource.

The client device refers to any computing device having communication means for accessing the Internet, processing means for processing data received from the Internet, and display means for displaying the processed data. The client device also has user interaction means; such as a keyboard, a mouse, a touch screen. Examples of client devices include computers, laptops, mobile phones, tablets, connected televisions, etc.

In a particular aspect of the method, the client device executes a browser. The browser is well known in the art, and consists of software executed on a client device, to enable the client device to interact with the Internet. For instance, the browser retrieves data from the Internet, processes the data, and causes display of the processed data on the client device. In this particular aspect of the method, the browser comprised in the client device implements the steps of: sending data from the client device to the at least one server; receiving data from the at least one server on the client device; and causing display on the client device of the Internet resource, the user-selectable object, and the sub-resource.

In a particular aspect of the method, the at least one server comprises a web server. The client device sends to the web server instructions to furnish the client device with the Internet resource. The client device receives from the web server the Internet resource. The client device sends to the web server instructions to furnish the client device with the sub-resource. The client device receives, from the web server the sub-resource. It is understood that the web server may include several web servers. The several web servers may be operated by one Internet resource publisher, to many Internet resource publishers, to providers of various networking and/or Internet services, or to any combination consisting of any of these categories.

In a particular aspect of the method, the at least one server comprises an optimization server. The client device sends to the optimization server instructions to furnish the client device with information regarding at least one particularly determined sub-resource of the Internet resource. And the client device receives from the optimization server the information regarding the at least one particularly determined sub-resource of the Internet resource. It is understood that the optimization server may include several optimization servers. The several optimization servers may be operated by one Internet resource publisher, to many Internet resource publishers, to providers of various networking and/or Internet services, or to any combination consisting of any of these categories.

In a particular aspect of the method, the at least one particularly determined sub-resource is defined by a provider of a search engine. And the aforementioned optimization server may be operated on behalf of the provider of the search engine.

In a particular aspect of the method, the at least one particularly determined sub-resource is defined by a provider of a web browser. And the aforementioned optimization server may be operated on behalf of the provider of the web browser.

In a particular aspect of the method, the at least one particularly determined sub-resource has been defined based on information related to a group of Internet resources of which the Internet resource is a member.

In a particular aspect of the method, the at least one particularly determined sub-resource has been defined based on information relating to the Internet resource.

In a particular aspect of the method, the at least one particularly determined sub-resource has been defined based on information relating to more than one of the sub-resources of the Internet resource.

In a particular aspect of the method, the at least one particularly determined sub-resource has been defined based on at least one specific criterion.

In a further particular aspect of the method, the at least one specific criterion is at least one selected from the group comprising: a popularity of the sub-resource and a usability of the sub-resource.

In another further particular aspect of the method, the at least one specific criterion is a common feature of Internet resources of a group of Internet resources of which the Internet resource is a member.

In a particular aspect of the method, the at least one particularly determined sub-resource is a plurality of particularly determined sub-resources. The number of particularly determined sub-resources may depend solely on the corresponding specific Internet resource; or it may depend on a category of Internet resources to which the Internet resource could belong to at any moment in time. For example, all the Internet resources corresponding to a category of e-commerce Internet resources may have three determined sub-resources; while all the Internet resources corresponding to a category of air line companies Internet resources may have two determined sub-resources. It is understood that the categorisation may depend solely on the similarity between types of determined sub-resources.

In a particular aspect of the method, the Internet resource is a home page of a website and the sub-resource is a web page other than the home page of the web site.

Referring now to FIG. 1, a method of navigating to at least one sub-resource of an Internet resource is represented.

Within the depiction of FIG. 1, there is provided a client device, a web server, and an optimization server (all not separately numbered in FIG. 1), as implemented in accordance to non-limiting embodiments of the present technology. FIG. 1 is a schematic representation of exchange if information between the client device, the web server and the optimization server while executing a method of navigating to at least one sub-resource of the Internet resource.

The client device sends instructions, to the web server, to furnish an Internet resource.

The client device sends instructions, to the optimization server, to furnish information regarding at least one particularly determined sub-resource of the Internet resource. For instance, if the requested Internet resource is a home page of a web site, the instructions can include the URL of the home page. It should be understood that any other suitable identifier of the Internet resource can be used.

The client device receives, from the web server, the Internet resource.

The optimization server further determines the at least one particularly determined sub-resource of the Internet resource, independently of the publisher of the Internet resource. For this purpose, the optimization server determines whether it has optimization data related to the Internet resource, and uses the optimization data to determine the corresponding at least one particularly determined sub-resource. Several non-limiting embodiments of the determination of the at least one particularly determined sub-resource of the Internet resource, independently of the publisher of the Internet resource, are provided later in the description.

The optimization server sends, to the client device, the information regarding the at least one particularly determined sub-resource of the Internet resource. The information includes instructions to display, contemporaneously with the display of the Internet resource, at least one user-selectable object, the user-selectable object having an associated indication of the at least one particularly determined sub-resource. And the information includes instructions to determine the associated indication of the at least one particularly determined sub-resource of the Internet resource. For instance, if the Internet resource is the home page of a web site, and the web site is an e-commerce web site, three sub-resources may be determined, corresponding to the following functionalities: shopping cart, delivery info, and "my account" page. And the information includes instruction to display three user-selectable objects, corresponding to the functionalities: shopping cart, delivery info, and "my account" page.

The client device receives, from the optimization server, the information regarding the at least one particularly determined sub-resource of the Internet resource.

The client device displays the Internet resource.

The client device displays contemporaneously with the display of the Internet resource, at least one user-selectable object. The user-selectable object has an associated indication of the at least one sub-resource of the Internet resource. The associated indication is based, at least in part, on the information. Referring to the aforementioned example of an e-commerce web site, the associated indications are the URLs of the web pages corresponding to the functionalities shopping cart, delivery info, and "my account" page. It is understood that the URLs of the web pages constitute one of many possible forms of indication, and that other forms of indication may be considered as well. To identify these URLs, the client device may download the Hyper Text Markup Language (HTML) code corresponding to the web site, and analyze the HTML code to identify the URLs corresponding to these functionalities. This analysis of the HTML code may be implemented by a browser executed on the client device. This may also be executed off line by using an updated database of Internet resources. An Internet search engine is an example of such database. Specifically, the search engine crawler crawls through most of Internet resources and copies them into a search engine database located on search engine servers. Then, all of the copied Internet resources are analyzed within the search engine database. This analysis may happen offline as it may happen online. And the optimization server is capable of determining the associated indication (the URL) of the sub-resource (the web page) corresponding to a specific functionality, using the analyzed data of the search engine database. The associated indication (the URL) is directly transmitted from the optimization server to the client device, as part of the information regarding the determined sub-resource.

Upon selection by a user of the client device of the at least one user-selectable object, the client device sends instruction to the web server, to furnish the corresponding sub-resource.

The client device receives, from the web server, the sub-resource.

The client device displays the sub-resource.

Figure 2B:
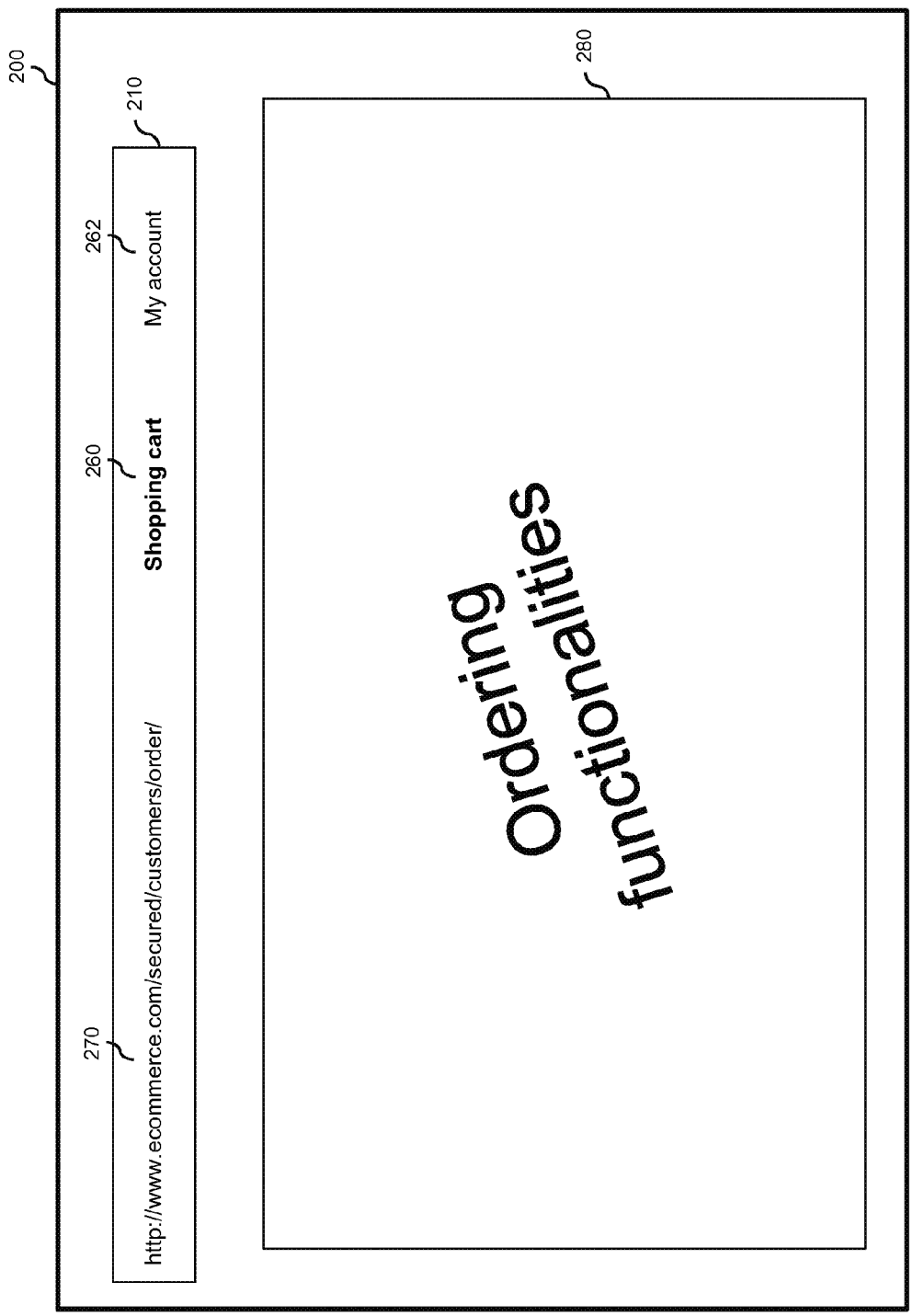

Referring now to FIGS. 2A and 2B concurrently, a the result of navigation to at least one sub-resource of an Internet resource is represented.

For example (in one embodiment), the Internet resource is the home page of a web site, having an URL www.commerce.com. The content 220 of the home page is displayed in a web browser interface 220, displayed on the client device. The URL 250 of the home page is displayed in an URL bar 210 of the web browser interface.

For illustration purposes, there are two particularly determined sub-resources corresponding to the home page of the web site. These two sub-resources are embodied in two other web pages of the web site. The first web page corresponds to ordering functionalities of the web site, having a first URL www.ecommerce.com/secured/customers/order. The second web page corresponds to user account management functionalities of the web site, having a second URL url_2.

The user-selectable objects consist respectively in user-selectable texts, representative of the functionalities of the sub-resources. The first user-selectable text 260 consists in "shopping cart", corresponding to the ordering functionality. The second user-selectable text 262 consists in "my account", corresponding to the user account management functionality. The two user-selectable texts 260 and 262 are displayed in the URL bar 210. For example, they are located on the right-hand side relative to the URL 250 of the home page. It is understood that the text may be any visually identifiable object that provides an indication to where the link leads to. It should be further understood that the location of the text is not limited and can be located at any other suitable location of the URL bar 210 or the web browser interface.

The associated indications of the user-selectable texts consist in the URL of the web pages. Thus, the first URL www.ecommerce.com/secured/customers/order is the associated indication of the first user-selectable text 260. And the second URL url_2 is the associated indication of the second user-selectable text 262.

Upon selection by a user (e.g. by means of an interaction of the user with a mouse, a mouse pointer 230 being displayed on the client device), of the first user-selectable object 200 (shopping cart), the first web page corresponding to the first URL www.ecommerce.com/secured/customers/order is requested and received from a web server, and the content of the first web page 280 is further displayed in the web browser interface 220. The first URL 270 (of the first web page) is now displayed in the URL bar 210.

In another particular embodiment, the user-selectable object may consist of a user-selectable image. For example, an icon representative of the functionality of the sub-resource corresponding to the user-selectable object.

In still another particular embodiment, the user-selectable object is highlighted when the corresponding sub-resource is displayed on the client device, as is the case depicted in FIG. 2B.

In still another particular embodiment, the Internet resource is a specific web page of a web site, different from the home page. For instance, the specific web page is the landing page when a referring web site refers the web site.

In still another embodiment, when the Internet resource is the home page of a web site, and when the user navigates the web site and accesses other web pages of the web site, the user-selectable objects are displayed for each of the other web pages (upon display of the other web pages).

In still another embodiment, once the user has navigated away from the home page of a web site, an additional user selectable object representative of the home page is displayed; for the purpose of further facilitating the navigation of the web site when on any page of the web site (different from the home page).

Following are several non-limiting embodiments of how the sub-resource of an Internet resource can be determined, independently of the publisher of the Internet resource. For illustration purposes, we consider that the Internet resource is the home page of a web site, and the sub-resource is a different web page of the web site.

In a first embodiment, the client device sends the URL of the home page to the optimization server (depicted in FIG. 1). The optimization server determines, based on the URL of the home page, that the Internet resource (the home page of the web site) belongs to a specific category of Internet resources (the home pages of a specific category of web sites). For various categories of web sites, the optimization server has a predefined list of functionalities corresponding to the sub-resources to be determined. A functionality represents a generic type of service, provided on a specific web page of a particular web site; and which is specifically relevant to a given category of web sites to which the particular web site belongs. It is assumed that most of the web sites belonging to the given category of web site implement the functionality. Thus, a user of the particular web site would expect to find the functionality on the particular web site, and an objective of the present method is to facilitate the access to this specific functionality. The optimization server sends the list of functionalities corresponding to the URL of the home page to the client device. Then, the client device analyzes the HTML code of the web site, to identify the URLs of the web pages corresponding to the sent list of functionalities. For instance, for an e-commerce web site, the functionalities may be predefined as follows: shopping cart, delivery info, "my account" page. For an air-line company web site, the functionalities may be predefined as follows: ticket purchase and on-line registration. For a banking web site, the functionalities may be predefined as follows: Automated Teller Machine (ATM) locator and on-line banking. For a mobile Operator web site, the functionalities may be predefined as follows: our offices, rates, send SMS, and my account. For a taxi web site, the functionalities may be predefined as follows: taxi and rates. And for an official file sharing web site, the functionalities may be predefined as follows: download and upload.

In a second embodiment, the client device collects information about the web pages visited by a user of the client device. This type of collection of information is well known in the art, and is usually referred to as web analytics. The functionality of collecting the information may be implemented by a browser executed on the client device. The client device transmits the collected information to the optimization server. The optimization server analyzes the information transmitted by multiple client devices, with respect to multiple web sites. The results of the analysis consist in behavioral data related to each web site; and include for example: number of hits, number of page views, number of visits, number of unique visitors, number of repeat visitors, number of new visitors, time spent on a page, referrer, navigation patterns through the web site, etc. Then, the sub-resources (the determined web pages) of the Internet resource (the main page of the web site) are determined based on the behavioral data. For instance, the criterion for determining the sub-resource is the number of web page views: the sub-resources for a particular web site correspond to the web pages which have been viewed by the largest number of visitors. Alternatively, the criterion may be the time spent on the web pages of a web site. Any combination of one or several behavioral criteria may be used to determine the sub-resources for a specific web site. Additional data, more directly related to the specific content of the web site, may be used (if available) for the determination of the sub-resources. For example, the data may be representative of the capability to generate the highest visitor outcome, where visitor outcome can be considered one of immediate revenue associated with a visitor action on the web page, future revenue associated with a visitor action on the web page, or the value of other successful outcomes.

The present technology also relates to a system for navigating to at least one sub-resource of an Internet resource. The system may implement all or some of the aspects of the aforementioned method of navigating to at least one sub-resource of an Internet resource.

In one aspect, the system comprises a client device. The client device includes a computer processor, a display operationally connected with the computer processor, a user interface operationally connected with the computer processor, a communication interface operationally connected with the computer processor and structured and configured to communicate with at least one server, and a non-transient computer information storage device operationally connected with the computer processor. The information storage device contains instructions that when executed by the computer processor effect a sending, from the client device to the at least one server, of instructions to furnish the client device with the Internet resource. The instructions effect a sending, from the client device to the at least one server, of instructions to furnish the client device with information regarding at least one particularly determined sub-resource of the Internet resource. The at least one particularly determined sub-resource is defined independently of the publisher of the Internet resource. The instructions effect a receiving, from the at least one server on the client device, of the Internet resource. The instructions effect a receiving, from the at least one server on the client device, of the information regarding the at least one particularly determined sub-resource of the Internet resource. The instructions effect a display, on the client device, of the Internet resource. The instructions effect a display, on the client device contemporaneously with the display of the Internet resource, of at least one user-selectable object. The user-selectable object has an associated indication of the at least one sub-resource of the Internet resource. The associated indication is based, at least in part, on the information. The instructions effect, upon a user of the client device selecting via the user interface one of the at least one user-selectable object, a sending, from the client device to the at least one server, of instructions to furnish the client device with the sub-resource. The instructions effect a receiving, from the at least one server on the client device, of the sub-resource. And the instructions effect a display, on the client device, of the sub-resource.

In another aspect, the system comprises at least one server. The at least one server includes a computer processor, a communication interface operationally connected with the computer processor and structured and configured to communicate with a client device, and a non-transient computer information storage device operationally connected with the computer processor. The information storage device contains instructions, that when executed by the computer processor effect a receiving, from the client device by the at least one server, of information regarding an Internet resource to be displayed on the client device. And the instructions effect a sending, by the at least one server to the client device, of information regarding at least one particularly determined sub-resource of the Internet resource. The at least one particularly determined sub-resource is defined independently of the publisher of the Internet resource. The information includes instructions to display, contemporaneously with the display of the Internet resource, at least one user-selectable object. The user-selectable object has an associated indication of the at least one particularly determined sub-resource. And the information includes instructions to determine the associated indication of the at least one particularly determined sub-resource of the Internet resource.

In a particular aspect of the system, the instructions contained in the information storage device of the client device, and executed by the computer processor, implement a browser. In this particular aspect of the method, the browser implements the steps of: sending data from the client device to the at least one server; receiving data from the at least one server on the client device; and causing display on the client device of the Internet resource, the user-selectable object, and the sub-resource.

In a particular aspect of the system, the at least one server comprises a web server. The instructions executed by the computer processor effect a sending, from the client device to the web server, of instructions to furnish the client device with the Internet resource. The instructions executed by the computer processor effect a receiving, from the web server on the client device, of the Internet resource. The instructions executed by the computer processor effect a sending, from the client device to the web server, of instructions to furnish the client device with the sub-resource. And the instructions executed by the computer processor effect a receiving, from the web server on the client device, of the sub-resource. As previously mentioned in the description, it is understood that the web server may include several web servers. The several web servers may be operated by one Internet resource publisher, to many Internet resource publishers, to providers of various networking and/or Internet services, or to any combination consisting of any of these categories.

In a particular aspect of the system, the at least one server comprises an optimization server. The instructions executed by the computer processor effect a sending, from the client device to the optimization server, of instructions to furnish the client device with information regarding at least one particularly determined sub-resource of the Internet resource. And the instructions executed by the computer processor effect a receiving, from the optimization server on the client device, of the information regarding the at least one particularly determined sub-resource of the Internet resource. As previously mentioned in the description, it is understood that the optimization server may include several optimization servers. The several optimization servers may be operated by one Internet resource publisher, to many Internet resource publishers, to providers of various networking and/or Internet services, or to any combination consisting of any of these categories.

In a particular aspect of the system, the at least one particularly determined sub-resource is defined by a provider of a search engine. And the aforementioned optimization server may be operated on behalf of the provider of the search engine.

In a particular aspect of the system, the at least one particularly determined sub-resource is defined by a provider of a web browser. And the aforementioned optimization server may be operated on behalf of the provider of the web browser.

In a particular aspect of the system, the at least one particularly determined sub-resource has been defined based on information related to a group of Internet resources of which the Internet resource is a member.

In a particular aspect of the system, the at least one particularly determined sub-resource has been defined based on information relating to the Internet resource.

In a particular aspect of the system, the at least one particularly determined sub-resource has been defined based on information relating to more than one of the sub-resources of the Internet resource.

In a particular aspect of the system, the at least one particularly determined sub-resource has been defined based on at least one specific criterion.

In a further particular aspect of the system, the at least one specific criterion is at least one selected from the group comprising: a popularity of the sub-resource and a usability of the sub-resource.

In another further particular aspect of the system, the at least one specific criterion is a common feature of Internet resources of a group of Internet resources of which the Internet resource is a member.

In a particular aspect of the system, the at least one particularly determined sub-resource is a plurality of particularly determined sub-resources.

In a particular aspect of the system, the Internet resource is a home page of a website and the sub-resource is a web page other than the home page of the web site.

Figure 3:
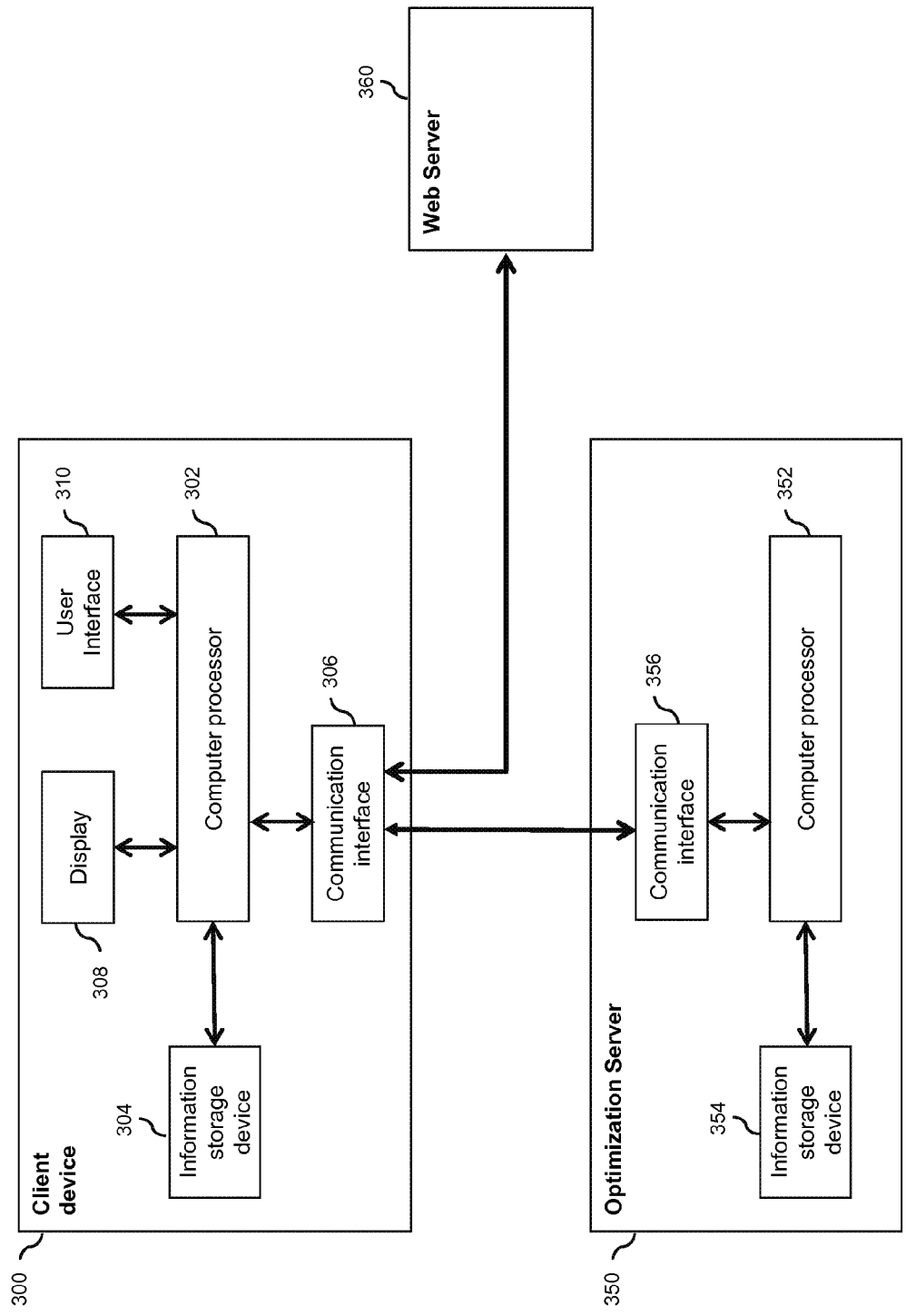
FIG. 3 illustrates a system for navigating to at least one sub-resource of an Internet resource, according to a non-limiting embodiment of the present technology.

Referring now to FIG. 3, a system for navigating to at least one sub-resource of an Internet resource is represented.

The system represented in FIG. 3 comprises a client device 300, an optimization server 350, and a web server 360. In some embodiments of the present technology, the optimization server 350 and the web server 360 can be implemented in a single server.

The client device 300 includes a computer processor 302, an information storage device 304, a communication interface 306, a display 308, and a user interface 310. The information storage device 304 contains instructions, that when executed by the computer processor 302 effect a navigation to at least one sub-resource of an Internet resource.

The optimization server 350 includes a computer processor 352, an information storage device 354, and a communication interface 356. The information storage device 354 contains instructions, that when executed by the computer processor 352 effect a navigation to at least one sub-resource of an Internet resource.

The web server 360 is a standard implementation of a web server, and is well known in the art.

The client device 300 communicates (sends requests and receives responses to the requests) with the web server 360 via its communication interface 306. And the client device 300 communicates (sends requests and receives responses to the requests) with the optimization server 350 via their respective communication interfaces 306 and 356.

Referring now to FIGS. 1 and 3 concurrently, a method and system for navigating to at least one sub-resource of an Internet resource is represented.

The client device 300 sends instructions, to the web server 360, to furnish an Internet resource.

The client device 300 sends instructions, to the optimization server 350, to furnish information regarding at least one particularly determined sub-resource of the Internet resource.

The client device 300 receives, from the web server 360, the Internet resource.

The optimization server 350 determines the at least one particularly determined sub-resource of the Internet resource, independently of the publisher of the Internet resource. Various non-limiting embodiments of the determination of a sub-resource of an Internet resource have been detailed previously in the description.

The optimization server 350 sends, to the client device 300, the information regarding the at least one particularly determined sub-resource of the Internet resource.

The client device 300 receives, from the optimization server 350, the information regarding the at least one particularly determined sub-resource of the Internet resource.

The client device 300 displays the Internet resource on the display 308.

The client device 300 displays contemporaneously with the display of the Internet resource, at least one user-selectable object on the display 308. The user-selectable object has an associated indication of the at least one sub-resource of the Internet resource. The associated indication is based, at least in part, on the information.

Upon selection by a user of the client device 300, via the user interface 310, of the at least one user-selectable object, the client device 300 sends instruction to the web server 360, to furnish the corresponding sub-resource.

The client device 300 receives, from the web server 360, the sub-resource.

The client device 300 displays the sub-resource on the display 308.

The present technology also relates to a non-transient computer information storage medium containing instructions for navigating to at least one sub-resource of an Internet resource. The instructions contained in the non-transient computer information storage system may implement all or some of the aspects of the aforementioned method of navigating to at least one sub-resource of an Internet resource.

In one aspect, the non-transient computer information storage medium contains instructions, that when executed by a computer processor effect a sending, from a client device to at least one server, of instructions to furnish the client device with an Internet resource. The instructions effect a sending, from the client device to the at least one server, of instructions to furnish the client device with information regarding at least one particularly determined sub-resource of the Internet resource. The at least one particularly determined sub-resource is defined independently of the publisher of the Internet resource. The instructions effect a receiving, from the at least one server on the client device, of the Internet resource. The instructions effect a receiving, from the at least one server on the client device, of the information regarding the at least one particularly determined sub-resource of the Internet resource. The instructions effect a display, on the client device, of the Internet resource. The instructions effect a display, on the client device contemporaneously with the display of the Internet resource, of at least one user-selectable object. The user-selectable object has an associated indication of the at least one sub-resource of the Internet resource. The associated indication is based, at least in part, on the information. The instructions effect, upon a user of the client device selecting one of the at least one user-selectable object, a sending, from the client device to the at least one server, of instructions to furnish the client device with the sub-resource. The instructions effect a receiving, from the at least one server on the client device, of the sub-resource. And the instructions effect a display, on the client device, of the sub-resource.

In one embodiment, the non-transient computer information storage medium corresponds to the information storage device 304 of the client device 300 represented in FIG. 3.

In another aspect, the non-transient computer information storage medium contains instructions, that when executed by a computer processor effect a receiving, from a client device by at least one server, of instructions regarding an Internet resource to be displayed on the client device. And the instructions effect a sending, by the at least one server to the client device, of information regarding at least one particularly determined sub-resource of the Internet resource. The at least one particularly determined sub-resource is defined independently of the publisher of the Internet resource. The information includes instructions to display, contemporaneously with the display of the Internet resource, at least one user-selectable object. The user-selectable object has an associated indication of the at least one particularly determined sub-resource. And the information includes instructions to determine the associated indication of the at least one particularly determined sub-resource of the Internet resource.

In a particular aspect of the non-transient computer information storage medium, the instructions contained in the information storage medium and executed by the computer processor implement a browser. In this particular aspect of the method, the browser implements the steps of: sending data from the client device to the at least one server; receiving data from the at least one server on the client device; and causing display on the client device of the Internet resource, the user-selectable object, and the sub-resource.

In a particular aspect of the non-transient computer information storage medium, the at least one server comprises a web server. The instructions executed by the computer processor effect a sending, from the client device to the web server, of instructions to furnish the client device with the Internet resource. The instructions executed by the computer processor effect a receiving, from the web server on the client device, of the Internet resource. The instructions executed by the computer processor effect a sending, from the client device to the web server, of instructions to furnish the client device with the sub-resource. And the instructions executed by the computer processor effect a receiving, from the web server on the client device, of the sub-resource. As previously mentioned in the description, it is understood that the web server may include several web servers. The several web servers may be operated by one Internet resource publisher, to many Internet resource publishers, to providers of various networking and/or Internet services, or to any combination consisting of any of these categories.

In a particular aspect of the non-transient computer information storage medium, the at least one server comprises an optimization server. The instructions executed by the computer processor effect a sending, from the client device to the optimization server, of instructions to furnish the client device with information regarding at least one particularly determined sub-resource of the Internet resource. And the instructions executed by the computer processor effect a receiving, from the optimization server on the client device, of the information regarding the at least one particularly determined sub-resource of the Internet resource. As previously mentioned in the description, it is understood that the optimization server may include several optimization servers. The several optimization servers may be operated by one Internet resource publisher, to many Internet resource publishers, to providers of various networking and/or Internet services, or to any combination consisting of any of these categories.

In one embodiment, the non-transient computer information storage medium corresponds to the information storage device 354 of the optimization server 350 represented in FIG. 3.

In a particular aspect of the non-transient computer information storage medium, the at least one particularly determined sub-resource is defined by a provider of a search engine. And the aforementioned optimization server may be operated on behalf of the provider of the search engine.

In a particular aspect of the non-transient computer information storage medium, the at least one particularly determined sub-resource is defined by a provider of a web browser. And the aforementioned optimization server may be operated on behalf of the provider of the web browser.

In a particular aspect of the non-transient computer information storage medium, the at least one particularly determined sub-resource has been defined based on information related to a group of Internet resources of which the Internet resource is a member.

In a particular aspect of the non-transient computer information storage medium, the at least one particularly determined sub-resource has been defined based on information relating to the Internet resource.

In a particular aspect of the non-transient computer information storage medium, the at least one particularly determined sub-resource has been defined based on information relating to more than one of the sub-resources of the Internet resource.

In a particular aspect of the non-transient computer information storage medium, the at least one particularly determined sub-resource has been defined based on at least one specific criterion.

In a further particular aspect of the non-transient computer information storage medium, the at least one specific criterion is at least one selected from the group comprising: a popularity of the sub-resource and a usability of the sub-resource.

In another further particular aspect of the non-transient computer information storage medium, the at least one specific criterion is a common feature of Internet resources of a group of Internet resources of which the Internet resource is a member.

In a particular aspect of the non-transient computer information storage medium, the at least one particularly determined sub-resource is a plurality of particularly determined sub-resources.

In a particular aspect of the non-transient computer information storage medium, the Internet resource is a home page of a website and the sub-resource is a web page other than the home page of the web site.

The invention claimed is:

1. A method of navigating to at least one sub-resource of an Internet resource, the method comprising:
    sending, from a client device to at least one server, instructions to furnish the client device with the Internet resource;
    sending, from the client device to the at least one server, instructions to furnish the client device with information regarding at least one particularly determined sub-resource of the Internet resource, the at least one particularly determined sub-resource being defined independently of the publisher of the Internet resource;
    receiving, from the at least one server on the client device, the Internet resource;
    receiving, from the at least one server on the client device, the information regarding the at least one particularly determined sub-resource of the Internet resource;
    displaying, on the client device, the Internet resource;
    displaying, on the client device contemporaneously with the display of the Internet resource, at least one user-selectable object, the user-selectable object having an associated indication of the at least one sub-resource of the Internet resource, the associated indication based, at least in part, on the information;
    upon a user of the client device selecting one of the at least one user-selectable object, sending, from the client device to the at least one server, instructions to furnish the client device with the sub-resource;
    receiving, from the at least one server on the client device, the sub-resource;
    displaying, on the client device, the sub-resource.

2. The method of any one of claims 1, wherein the at least one server comprises a web server and an optimization server, and wherein the web server is responsible for interacting with the client device for the client device to execute:
    said sending, from the client device to the web server, instructions to furnish the client device with the Internet resource;
    said receiving, from the web server on the client device, the Internet resource;
    said sending, from the client device to the web server, instructions to furnish the client device with the sub-resource;
    said receiving, from the web server on the client device, the sub-resource.

3. The method of any one of claims 1, wherein the at least one server comprises an optimization server and a web server, and wherein the optimization sever is responsible for interacting with the client device for the client device to execute:

sending, from the client device to the optimizing server, instructions to furnish the client device with information regarding at least one particularly determined sub-resource of the Internet resource;

receiving, from the optimizing server on the client device, the information regarding the at least one particularly determined sub-resource of the Internet resource.

4. The method of claim 1, wherein the at least one particularly determined sub-resource has been defined by a provider of a search engine.

5. The method of claim 1, wherein the at least one particularly determined sub-resource has been defined by a provider of a web browser.

6. The method of claim 1, wherein the at least one particularly determined sub-resource has been defined based on information related to a group of Internet resources of which the Internet resource is a member.

7. The method of claim 1, wherein the at least one particularly determined sub-resource has been defined based on information relating to the Internet resource.

8. The method of claim 1, wherein the at least one particularly determined sub-resource has been defined based on information relating to more than one of the sub-resources of the Internet resource.

9. A method of navigating to at least one sub-resource of an Internet resource, the method comprising:

receiving, from a client device by at least one server, information regarding an Internet resource to be displayed on the client device;

sending, by the at least one server to the client device, information regarding at least one particularly determined sub-resource of the Internet resource, the at least one particularly determined sub-resource having been defined independently of the publisher of the Internet resource, the information including instructions to display, contemporaneously with the display of the Internet resource, at least one user-selectable object, the user-selectable object having an associated indication of the at least one particularly determined sub-resource, and the information including instructions to determine the associated indication of the at least one particularly determined sub-resource of the Internet resource;

upon a user of the client device selecting one of the at least one user-selectable object, receiving, from the client device by the at least one server, instrucrions to furnish the client device with the sub-resource; and sending, from the at least one server to the client device, the sub-resource.

10. The method of any one of claim 9, wherein the at least one particularly determined sub-resource has been defined by a provider of a search engine.

11. The method of any one of claim 9, wherein the at least one particularly determined sub-resource has been defined by a provider of a web browser.

12. The method of any one of claim 9, wherein the at least one particularly determined sub-resource has been defined based on information related to a group of Internet resources of which the Internet resource is a member.

13. The method of any one of claim 9, wherein the at least one particularly determined sub-resource has been defined based on information relating to the Internet resource.

14. The method of any one of claim 9, wherein the at least one particularly determined sub-resource has been defined based on information relating to more than one of the sub-resources of the Internet resource.

15. A system for navigating to at least one sub-resource of an Internet resource, comprising a client device, the client device including:

a computer processor;

a display operationally connected with the computer processor;

a user interface operationally connected with the computer processor;

a communication interface operationally connected with the computer processor and structured and configured to communicate with at least one server;

a non-transient computer information storage device operationally connected with the computer processor, the information storage device containing instructions that when executed by the computer processor effect:

a sending, from the client device to the at least one server, of instructions to furnish the client device with the Internet resource;

a sending, from the client device to the at least one server, of instructions to furnish the client device with information regarding at least one particularly determined sub-resource of the Internet resource, the at least one particularly determined sub-resource being defined independently of the publisher of the Internet resource;

a receiving, from the at least one server on the client device, of the Internet resource;

a receiving, from the at least one server on the client device, of the information regarding the at least one particularly determined sub-resource of the Internet resource;

a display, on the client device, of the Internet resource;

a display, on the client device contemporaneously with the display of the Internet resource, of at least one user-selectable object, the user-selectable object having an associated indication of the at least one sub-resource of the Internet resource, the associated indication based, at least in part, on the information;

upon a user of the client device selecting via the user interface one of the at least one user-selectable object, a sending, from the client device to the at least one server, of instructions to furnish the client device with the sub-resource;

a receiving, from the at least one server on the client device, of the sub-resource;

a display, on the client device, of the sub-resource.

16. The system of any one of claim 15, wherein the at least one server comprises a web server for:

effecting a sending, from the client device to the web server, of instructions to furnish the client device with the Internet resource;

effecting a receiving, from the web server on the client device, of the Internet resource;

effecting a sending, from the client device to the web server, of instructions to furnish the client device with the sub-resource;

effecting a receiving, from the web server on the client device, of the sub-resource.

17. The system of any one of claim 15, wherein the at least one server comprises an optimization server for:

effecting a sending, from the client device to the optimization server, of instructions to furnish the client device with information regarding at least one particularly determined sub-resource of the Internet resource;

effecting a receiving, from the optimization server on the client device, of the information regarding the at least one particularly determined sub-resource of the Internet resource.

18. A system for navigating to at least one sub-resource of an Internet resource, comprising at least one server, the at least one server including:
- a computer processor;
- a communication interface operationally connected with the computer processor and structured and configured to communicate with a client device;
- a non-transient computer information storage device operationally connected with the computer processor, the information storage device, containing instructions that when executed by the computer processor effect:
  - a receiving, from the client device by the at least one server, of information regarding an Internet resource to be displayed on the client device;
  - a sending, by the at least one server to the client device, of information regarding at least one particularly determined sub-resource of the Internet resource, the at least one particularly determined sub-resource having been defined independently of the publisher of the Internet resource, the information including instructions to display, contemporaneously with the display of the Internet resource, at least one user-selectable object, the user-selectable object having an associated indication of the at least one particularly determined sub-resource, and the information including instructions to determine the associated indication of the at least one particularly determined sub-resource of the Internet resource;
- a receiving, upon a user of the client device selecting one of the at least one user-selectable object, from the client device by the at least one server, of instructions to furnish the client device with sub-resource; and
- sending, from the at least one server to the client device, the sub-resource.

* * * * *

UNITED STATES PATENT AND TRADEMARK OFFICE
CERTIFICATE OF CORRECTION

PATENT NO. : 9,594,484 B2
APPLICATION NO. : 14/433026
DATED : March 14, 2017
INVENTOR(S) : Segalovich et al.

It is certified that error appears in the above-identified patent and that said Letters Patent is hereby corrected as shown below:

In the Claims

Claim 2, Column 18, Line 52, "The method of any one of claims 1..." should read The method of claim 1

Claim 3, Column 18, Line 66, "The method of any one of claims 1..." should read The method of claim 1

Claim 3, Column 19, Line 1, "...optimization sever..." should read optimization server Claim 10, Column 19, Line 53, "The method of any one of claim 9..." should read The method of claim 9

Claim 11, Column 19, Line 56, "The method of any one of claim 9..." should read The method of claim 9

Claim 12, Column 19, Line 59, "The method of any one of claim 9..." should read The method of claim 9

Claim 13, Column 19, Line 63, "The method of any one of claim 9..." should read The method of claim 9

Claim 14, Column 19, Line 66, "The method of any one of claim 9..." should read The method of claim 9

Claim 16, Column 20, Line 50, "The system of any one of claim 15..." should read The system of claim 15

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*

Claim 17, Column 20, Line 62, "The system of any one of claim 15..." should read The system of claim 15